(12) United States Patent
Gadbois

(10) Patent No.: US 7,899,669 B2
(45) Date of Patent: Mar. 1, 2011

(54) MULTI-VOICE SPEECH RECOGNITION

(76) Inventor: Gregory John Gadbois, Amesbury, MA (US)

( * ) Notice: Subject to any disclaimer, the term of this patent is extended or adjusted under 35 U.S.C. 154(b) by 1092 days.

(21) Appl. No.: 11/607,608

(22) Filed: Dec. 1, 2006

(65) Prior Publication Data

US 2007/0136059 A1 Jun. 14, 2007

Related U.S. Application Data

(60) Provisional application No. 60/749,573, filed on Dec. 12, 2005, provisional application No. 60/830,066, filed on Jul. 11, 2006.

(51) Int. Cl.
*G10L 15/00* (2006.01)
(52) U.S. Cl. ....... 704/235; 704/251; 704/255; 379/88.01
(58) Field of Classification Search .................. 704/235, 704/251, 255; 379/88.01
See application file for complete search history.

(56) References Cited

U.S. PATENT DOCUMENTS

| | | | | |
|---|---|---|---|---|
| 5,182,765 A | * | 1/1993 | Ishii et al. | 379/88.04 |
| 5,754,978 A | * | 5/1998 | Perez-Mendez et al. | 704/255 |
| 6,292,779 B1 | * | 9/2001 | Wilson et al. | 704/257 |
| 6,374,212 B2 | * | 4/2002 | Phillips et al. | 704/231 |
| 6,526,380 B1 | * | 2/2003 | Thelen et al. | 704/251 |
| 7,587,319 B2 | * | 9/2009 | Catchpole | 704/235 |
| 2002/0193991 A1 | | 12/2002 | Bennett et al. | |
| 2003/0115053 A1 | * | 6/2003 | Eide et al. | 704/231 |
| 2004/0210437 A1 | * | 10/2004 | Baker | 704/251 |
| 2005/0182628 A1 | * | 8/2005 | Choi | 704/252 |
| 2006/0053014 A1 | * | 3/2006 | Yoshizawa | 704/256.4 |
| 2009/0326941 A1 | * | 12/2009 | Catchpole | 704/235 |

FOREIGN PATENT DOCUMENTS

| | | |
|---|---|---|
| EP | 1308929 | 5/2003 |
| EP | 1589525 | 10/2005 |
| WO | WO 99/46763 | 9/1999 |
| WO | WO 2004/057574 | 7/2004 |

OTHER PUBLICATIONS

Extended European Search Report, issued Jun. 17, 2008, for European Application 06125276.3.

* cited by examiner

*Primary Examiner* — Daniel D Abebe
(74) *Attorney, Agent, or Firm* — Jones Day

(57) ABSTRACT

Multi-voice speech recognition systems and methods are provided. A speech recognition apparatus may include a plurality of speech recognition means operating in parallel; means for determining the best scoring hypothesis for each speech recognition means and the best overall score; and pruning means for pruning of hypotheses of the speech recognition means based on the best overall score.

24 Claims, 3 Drawing Sheets

Diagram 3.

Diagram 1.

Diagram 3.

MULTI-VOICE SPEECH RECOGNITION

CROSS-REFERENCE TO RELATED APPLICATION

This application claims priority to and the benefit of U.S. Provisional Application Ser. Nos. 60/749,573 filed Dec. 12, 2005 and 60/830,066 filed Jul. 11, 2006, of which the entire disclosures (including any and all figures) are incorporated herein by reference.

TECHNICAL FIELD

The technology described herein relates generally to a method of doing speech recognition and a respective speech recognition apparatus.

RELATED ART

The speech recognition technology described herein can be used to attack many difficult recognition problems and solve those problems efficiently. The types of problems addressed are, for instance, speaker-independent recognition, language-independent recognition, and noise robust recognition. Many different strategies have been used for solutions on these various problems. For example, composite models are the current state of the art method to achieve speaker-independence. But composite phonetic models are large, have big computational requirements, and are ill suited for small, portable devices. To handle noise issues, standard techniques include filtering out the noise during signal processing and adding a noise floor. Closer to this patent application, there is nothing new about multiple re-recognition passes. For example speech scientists that build composite models serially reprocess their collected speech data with different speaker models. They search for a "good" set of speakers that span typical voices and are doing serial re-recognition. Generally this search (running multiple passes of recognition using many different model sets) is an onerous task and often fleets of computers are used.

SUMMARY

The multi-voice speech recognition technology described herein can be applied to these problems. Multi-voice speech recognition runs recognition in parallel and runs them efficiently. The parallel recognition is so efficient, it can be made to run on small battery powered devices.

In one example embodiment, multiple recognition engines may be run in parallel. Pruning across the different recognition engines may be used to manage efficiency. In another example, the signal processing may be separated into two parts, sharing a common piece and then doing recognition engine specific signal processing. Because the speech recognition technology is efficient, those applications can be made to run on small battery powered devices.

A multi-voice speech recognition method may include the steps of: operating a plurality of speech recognition processes in parallel; determining the best scoring hypothesis for each speech recognition process and the best overall score; and pruning of hypotheses of the plurality of speech recognition processes based on the best overall score. A multi-voice speech recognition apparatus may include a plurality of speech recognition means operating in parallel; means for determining the best scoring hypothesis for each speech recognition means and the best overall score; and pruning means for pruning of hypotheses of the speech recognition means based on the best overall score.

DETAILED DESCRIPTION

Figure 1:
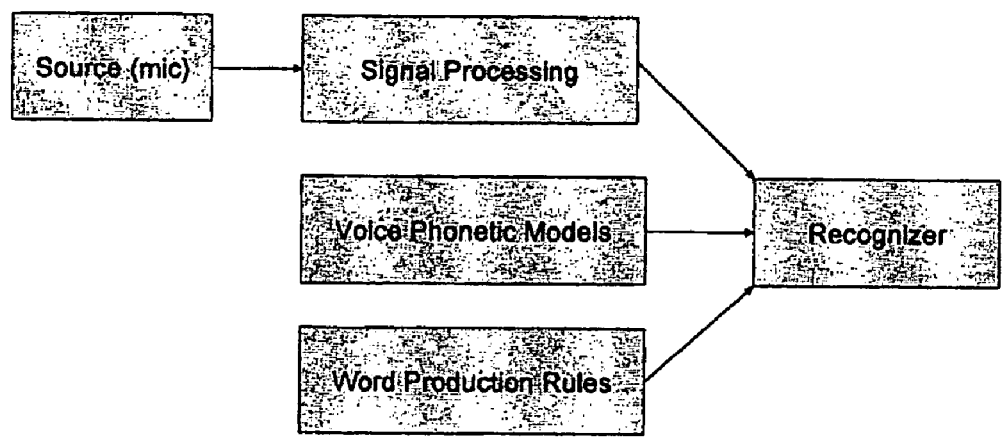
FIG. 1 is a schematic illustration of a conventional speech recognition system.

FIG. 1 is a schematic illustration of a conventional speech recognition system.

Usually in speech recognition, there is a source of speech data (typically a person sitting in front of a microphone). The speech data is digitized and signal processing is done. The raw speech data is digitized to make a vector of numbers characterizing a time window of sound. The recognition engine uses 1) the stream of these vectors of sound data, 2) acoustic phonetic models, e.g. Hidden-Markov-Models (HMM), of speech units such as phones (consistent with the signal processing), and 3) word production rules (a list of the things that may be spoken).

The recognizer starts the recognition process as soon as the person begins speaking. Using the word production rules, it has a list of all the first words that might be spoken. It starts with a pool of hypotheses that correspond to these start words. As data comes in, the speech recognizer scores these words, by comparing the sounds that should be there (assuming it is the particular word being spoken by the speaker) to the actual data coming in. Each hypothesis has a current score (a cumulative score of the fit of the hypothesis from the beginning silence to the current frame of data). One of the hypotheses has the best current score. By comparing each hypothesis to the best score, the recognizer can discard hypotheses that are very poor matches to the sounds being spoken. Badly scoring hypotheses are pruned. This reduces the amount of work to be done by the recognizer. When the final sounds of a word are scoring well, new hypotheses of words that might follow this word are added to the pool. Word production rules are consulted to get the list of successor words. So as a person is speaking, bad hypotheses are being pruned and new ones are being seeded as "good" scoring words finish.

In order to achieve speaker-independence or noise robustness, prior art speech recognition systems apply large acoustic phonetic models which have been trained for many speakers and/or acoustic environments. In the training process, the variability of the training data regarding different speakers and/or noise is transformed into the phonetic models which are either broad and blurred, or large having many mixture components to cover all variations in the training data. Broad and blurred phonetic models do not achieve a reasonable recognition accuracy. Large phonetic models are difficult to handle in the training process and in the recognition process and slow down the recognition speed significantly. Speaker independent phonetic models are thus not suited for small, portable devices with limited resources in memory and CPU power.

Figure 2:
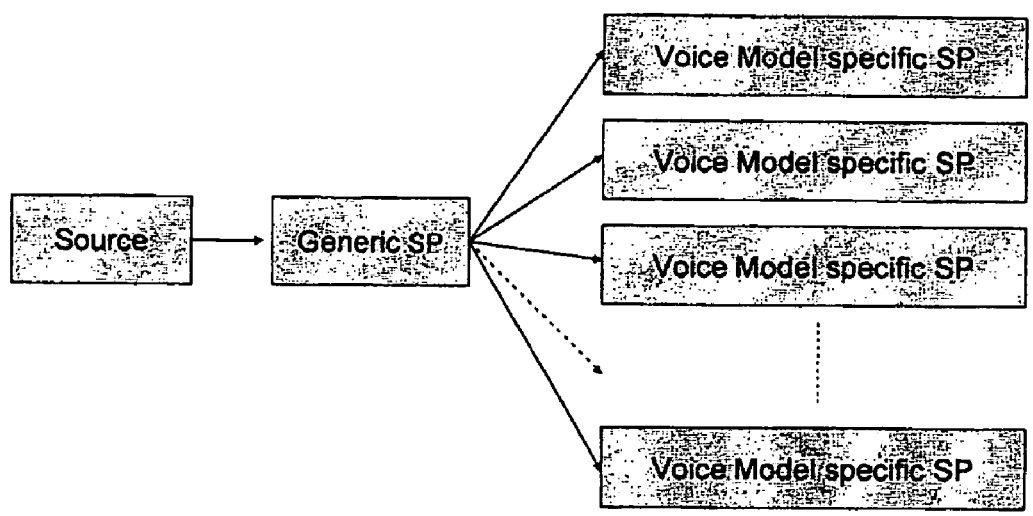
FIG. 2 schematically illustrates multi-voice signal processing.

FIG. 2 schematically illustrates multi-voice signal processing.

Speech recognition based on a set of parallel operating recognizers (recognition engines) is referred to in the following as Multi-Voice architecture.

When parallel sets of phonetic models are run, a first efficiency aspect is in the signal processing stage. The signal processing typically can be divided into a piece that is the same for all phonetic models and a piece that is model dependent. For example, there may be an initial Fourier transform happening on the digitized sound that happens for all models. That part of the signal processing can be shared. Optionally, there may be a vocal tract length normalization applied to the data which can be different for different sets of models so that can't be shared. The general principle for enhancing efficiency is share what can be shared. Don't re-compute something if you don't have to.

According to another aspect, a plurality of speech recognition engines run in parallel. A speech recognition engine is an independent speech recognition process configured for some recognition task. A speech recognition engine may be implemented by software operating on a computer. The software instructions execute on the computer in a speech recognition process. Multiple processes may execute on one or more computing devices. For instance, one speech recognition process is configured with corresponding acoustic phonetic models (such as HMMs) to recognize spoken words for one particular speaker. The phonetic models may be monophone or tri-phone models trained for speech samples of the particular speaker. A dictionary may comprise production rules for the recognition vocabulary, i.e. how words can be assembled by the phonetic models. Further, a language model, e.g. a grammar or statistical model, may restrict the sequence of the recognized words during the recognition process. Each speech recognition process operates in parallel and processes speech input data.

In one example, multiple speech recognition processes, each using speaker dependent phonetic models, process the input data and generate speech recognition results, i.e. word hypothesis, which are then joined to generate the speaker independent recognition results. This is different from the prior art which applies only one set of speaker independent phonetic models within one speech recognition process.

In another example, the efficiency of the plurality of speech recognition engines operating in parallel is enhanced by applying a cross-recognition engine pruning strategy. For this purpose, the overall best scoring hypothesis among all recognition engines is determined. Hypotheses generated in the recognition engines are pruned based on the overall best score. Optionally, each recognizer may apply its own internal pruning based on the best scoring internal hypothesis. Both pruning strategies may apply the same or different pruning thresholds. A pruning threshold is applied on the score difference between the best score and the actual hypothesis to determine whether to discarded the actual hypothesis. If the score difference exceeds the pruning threshold, the hypothesis is pruned in order to reduce the number of active hypotheses in the recognition engine.

The parallel set of recognizers each take 1) a stream of sound vectors, 2) their respective phonetic models, and 3) word production rules, and operate on the speech input data in parallel.

The phonetic models that a particular recognizer uses are preferably typically small, fast scoring, speaker-dependent models. With the multi-voice signal processing technology of FIG. 2, however, they need not be large speaker-independent composite mixture models. Speaker independence can be achieved through the parallel recognition approach. In general, phonetic models can be designed to do one thing well. They don't need to be all things to all speakers.

The multi-voice processing technology shown in FIG. 2 enables sets of models with sets of recognizers to be used to cover all speakers, instead of mixing the characteristics of all speakers in one set of phonetic models.

Still, if there is good reason, the architecture does not prohibit the use of large composite speaker-independent models.

Figure 3:
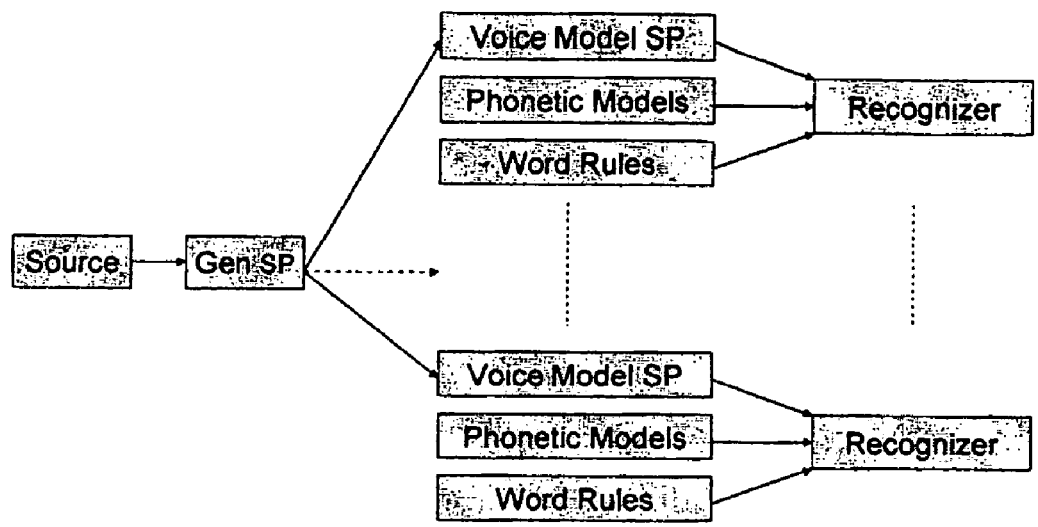
FIG. 3 is a schematic diagram of the parallel speech recognition processes in a multi-voice recognizer.

FIG. 3 is a schematic diagram of the parallel recognition engines in a multi-voice recognizer.

Conceptually each recognizer has its own production rules. The word production rules for the different recognizers aren't necessarily the same. The different recognizers can be looking for different word sets—even in different languages. If some subsets of recognizers are running with the same rule sets, either separate copies can be made or a shared rule set might be used. From the point of view of the individual recognizers, each has its own version.

Each recognizer starts with a pool of hypotheses generated from the start words of its word production rules. The individual recognizers run in parallel. When data comes through the signal processing stage, each recognizer gets one new vector of sound data. The process steps through each recognizer with the new sound data. Each recognizer scores its pool of hypotheses keeping track of that pool's best score. Among all the best scores, one pool's best score is the very best score overall.

The system may use that very best score to prune all the pools. The system will also use that very best score as a basis for deciding when the end of a word is scoring "well" and hence when to seed new hypotheses of following words. For this purpose, the word production rules for the appropriate pool/recognizer are consulted to get the list of following words. So the processing of a new frame of data is a 2-step process. First all hypotheses scores (in all pools) are updated with the new frame of data and the best overall score is found. Then using this best overall score a second pass begins. In each pool all the hypotheses are pruned and new hypotheses for the following words are seeded (where scores were "good"). All the recognizers then advance together to the next frame of speech data.

Should all the hypotheses in the pool of a particular recognizer be pruned, the whole recognizer may be pruned. If model specific signal processing feeds no recognizer, that signal processing may be pruned.

It is preferred that only one model for the silence/environment/background noise is used. Preferably, there is an implicit assumption that all the models for the different recognizers are running on the same scale, that a "right" recognition has a better score than incorrect modeling. It is preferred that the recognizers are modeling the silence consistently, that a hypothesis of silence for the current frame is the same penalty across all recognizers. The different hypotheses must compete on the basis of the speech. It is preferred if the silence model is dynamic e.g., it tracks the environment. The particular variation for tracking the environment sound and scoring a frame of sound as silence that is used is not relevant, only that a consistent scoring for environmental noise across the parallel recognizers is applied.

The multi-voice recognition system provides a general solution to recognition/search/modeling problems in speech recognition. In one example, speech recognition may be performed using the following steps:

Do the searches in parallel with multiple model sets.

Let the best scoring interim hypotheses limit all the searches (by pruning badly scoring hypotheses).

Be careful that the background (absence of voice signal) is treated consistently across the parallel searches.

Prune whole sets of models and search engines when a model set has no active hypotheses.

In practice with speech, what happens is that a number of recognizers with many different sets of modeling are started. Very quickly the "right" modeling (e.g., phonetic models that fit the voice) scores much better than "wrong" modeling and all the "wrong" modeling recognizers are pruned. Very quickly the computational requirement is reduced and is much lower than the initial requirement. At the start of recognition, the parallel recognizers may be running slower than real-time. The input is buffered, and when most of the recognizers are pruned, recognition catches up and finishes in real-time, even on a small machine.

On a large machine, the number of parallel model sets can be staggering. The Multi-Voice architecture allows tremendously detailed modeling over the range of possible speakers. This can achieve better speaker independence without the use of large multi-mixture component phonetic models.

Running on different word sets—different recognizers running with different languages and doing simultaneous multi-language recognition—was already mentioned. With sufficient horsepower (e.g. a desktop machine) it is possible to run simultaneous speaker-independent and language-independent recognition (i.e. spectrums of voice models running on multiple language vocabularies).

Another use multi-voice speech recognition is to tailor the computational requirement of a particular problem to what is available on a particular device. For example with a limited device, one might do a small problem, search for top-level menu commands, with many parallel recognizers (doing the problem in a speaker independent-possibly even a language independent-fashion). But once one has identified the modeling that is "good" for the current speaker, one might attack a larger recognition problem (e.g. a sub-dialog of the main menu having a huge vocabulary) with just those models, lowering the computational requirement for that part of the problem. To the user, the implementation seems speaker independent, but only the top level commands are attacked speaker independently.

Another use is to have multiple sets of models for the same speaker but with different types and/or levels of background noise embedded in the models. Then, running with all of them active, the models that most correctly model the current speech and noise "wins" and accurate recognition results in all noise situations.

There are many embodiments to realizing multi-voice speech recognition. A large efficiency of Multi-Voice parallel recognition comes from the ability to prune whole recognition processes. An important feature of Multi-Voice recognition is considered to be: synchronous parallel recognizers with a shared hypothesis pruning and/or seeding mechanism. There are many variations on the multi-voice speech recognition that still captures this efficiency. Whether the phonetic models are either small speaker-dependent models, larger speaker-independent mixture models, or something in between (whatever the specifics of the modeling is), depends on details of the embodiment. Whether the recognizers share, partially share, or don't share signal processing, depends on details of the embodiment. Whether the word production rules are shared, partially shared, or aren't shared, depends on details of the embodiment.

According to one embodiment, the recognition process is only partially synchronous, where the individual recognizers are run on partial data and "best scores" at particular "data times" are recorded. In order to make this clearer, let a first recognizer run (possibly on partial data), it creates a record of best scores at data times. When the next recognizer runs (on the same data) it uses the best score record (updating it if it is better), pruning and seeding with it. The system cycles through all the recognizers and eventually gets the benefit of pruning whole machines. Optionally, the system rotates the best scoring machine to be the first machine to process the next block of data. The system according to this embodiment is not synchronous with the frame rate, rather the recognizers process varying blocks of data at any given time. But this method still shares the characteristics of multiple recognizers using a common "best score" for the pruning of hypotheses and the pruning of whole machines.

The following section illustrates a further embodiment which is enabled by the Multi-Voice recognizer concept. We will outline a new Multi-Voice architecture for an operating system recognition service and the impact it has on application design.

With the Multi-Voice architecture there are parallel competing recognizers. When a process asks the operating system recognition manager to listen for its word set, a recognizer is assigned to that problem. When another process asks the recognition manager to listen for its word set, a different recognizer is assigned to listen. Multiple processes listening for their specific word sets can be simultaneously supported by a recognition manager running parallel competing recognizers. When the user speaks, all the word sets are competing to identify what is spoken. When the top choice is discovered, it is learned which recognizer won, and hence which process should be notified with the results. This allows flat access to processes in the user interface. Using the Multi-Voice architecture this type of recognition service can be provided efficiently.

Consider the situation where a swarm of processes (e.g., application programs) are launched. They each register their command sets and go dormant. When the user speaks, the corresponding recognizers with competing command sets attempt to recognize the utterance. The best scoring result across all recognizers wins. At that point it is known both what was said and which process to bring to the foreground and notify with the recognition results. Thus, the recognition manager may operate as a user interface task switcher directing the focus of input/output operations to the application program being associated to the best scoring recognizer. The "winning" process may be brought to the foreground in terms of the user interface. Further, the "winning" process may receive assigned other computer resources such as the CPU and the active task on the computer may be switched to the "winning" process.

This mimics very well human intelligence—the ability to change topics and field questions on a multitude of topics instantly. This is a revolutionary step in user interfaces. And it is particularly important for embedded devices.

This is in contrast with all the previous implementations of recognition system services which only supported one process at a time. Previous recognition services were modeled after the keyboard service. Only one process could "own the microphone/recognizer". The service had to be claimed by the application and would lose it if another application took it away. There is an idea of a "focus" just like the keyboard. An application had to have the "focus" to be the recipient of microphone input.

With a keyboard it is not possible to make a late judgment about which process should get the next keystroke. With speech recognition the content of the utterance is sufficient to judge which process should receive the utterance. This is the key new idea of an embodiment. No single process "owns" the recognizer. The recognition service decides which process to notify based on the recognition results.

The Multi-Voice system service of the invention combined with a "Service-Oriented Architecture" (SOA) obviates the need for a monolithic application. SOA is a concept evolving out of web services that solves a "middleware" problem. SOA implements a loose coupling between software agents. When a process comes alive providing a web service (for example it might own a database) it registers a standardized interface to a central repository. Later, another process (having no knowledge of the database) can ask the registry of agents if it is possible to answer a database question, have the query routed to the process owning the database, and receive an answer. The key to the SOA architecture is creating simple standardized query-able software interfaces and then registering them with an active registry. What SOA does for "middleware" is the same as what a Multi-Voice recognition service will do for the user interface. Each user interface process registers its command set with the Multi-Voice recognition service, then when a command is spoken the service routes the utterance to the process competent to deal with the user's request (analogous to the SOA agent registry). With this flat access to processes, there is no perceived distinction in the user interface between one process and several. The programmer is free to implement an application as either one process or several.

This will have a tremendous impact on software design. The monolithic application can be broken up into a set of simpler applications that have clearer simpler purpose. The application programmers don't have to worry about the total recognition problem.

They can view the recognizer as their dedicated resource working on their local recognition problem. The smaller applications are easier to debug and easier to evolve. Obsolescence is easier to control. The separate pieces can be individually replaced or improved. Or more services can be added as separate processes, augmenting the total services. The Multi-Voice recognizer as the user interface mediator gives flat access to all the separate pieces. In a monolithic application, one had to hard code the global organization of the parts. When the parts evolved, one had to update the global organization. With an SOA style Multi-Voice application, there is no hard coded global organization. Each of the separate applications registers its command set. The user pulls the pieces forward with his queries. It doesn't so much force an organization on the user, as reacts to the user's needs.

To make this concrete, consider a monolithic healthcare application. It might incorporate a disease database, a pharmaceutical database, a patient records database, a diagnostic wizard (for diagnosing illnesses), and connect to measuring devices, and do form filling. The SOA style Multi-Voice "meta-app" would have separate processes for each of these pieces.

A user launches a swarm of applications (that make up the healthcare "meta-app") and then interacts with the processes by voice commands. The user of the "meta-app" might start by pulling up a particular form. One of the fields of the form might be blood pressure and he might request a blood pressure measurement. The blood pressure cuff might be an active measuring device. Its process comes alive, the user interacts with the measurement process, takes a measurement and the measurement is returned to the forms application. Next, he might start filling out symptoms and find himself in the diagnostic wizard, and browse a bit there. He might take a detour into the disease database looking up a disease. He eventually returns to his form with a list of possible maladies and the course of action that he recommends. When he finishes, he submits his new record into the patient records database, all the switching between processes happening transparently through the Multi-Voice recognition service.

All the processes were separate, each with a limited scope and their own command set and no direct knowledge of the other pieces. Flat access through the Multi-Voice system service gave the perception of a whole. The programming considerations for each separate process remain simple. They each assume there is only one recognizer and they own it. They don't worry about a global recognition problem. They only have to define their local speech user interface. Because the pieces are smaller and self-contained they are more easily debugged and can evolve more quickly. In addition, the smaller parts are more adaptable and reusable. For example using the healthcare application, suppose a solution for a different institution needs to be developed and they have completely different forms and patient records. They need only write new form applications and patient records applications (cannibalizing the old ones). Then replace the old ones with new ones in the swarm.

According to another aspect of the Multi-Voice Recognition service the programmer's burden is simplified. The additional feature is the recognition service supporting a state machine of "topics". In smaller hardware (e.g. embedded devices), the lack of CPU horsepower is a serious constraint on the system. Many processes all with large command sets can bring the hardware to its knees. A solution that lowers the recognition burden and does not seriously add to the programmers burden is to add some state machine support. The Multi-Voice recognition service supports the concept of an "AlwaysActive" topic and a named current topic. An application can define a topic string and specify word production rules associated with that string. It can also query what the current named topic is or set the current named topic. When the recognition service is listening for speech, all the word production rules of all the applications that have listed production rules for the "AlwaysActive" topic are alive. Additionally whatever the current named topic is, all the applications that have listed production rules for that named topic are also alive. At anytime an application can create new rules, it can redefine or delete its associations of production rules and topic strings. Additionally an application can lock the recognition to itself and force recognition to be constrained to just the set of production rules it specifies. In this way in small hardware, applications can be "friendly" and define smaller "AlwaysActive" word sets, then when they get the focus or one of their AlwaysActive production rules "wins", they can set the current named topic to something unique to themselves and turn on their larger vocabulary recognition problems. There can also be some cooperation among applications "in the know". For example in the healthcare application, suppose the disease database application and the diagnostic wizard application were to both define production rules for the topic string "Diagnose". Then a relevant subset of disease database commands could come alive when the diagnostic wizard sets the current topic to "Diagnose".

In addition (to facilitate cut and paste activities between processes) the recognition service keeps track of the "previous current topic" and the previous process that set it. This data is also useful to implement an "undo".

There are many ways to marry state machine support into a Multi-Voice recognition service and that support does enhance the functionality of the recognition service. In one embodiment, minimal state machine support is implemented. Another embodiment might allow multiple active topics, or it might keep a list for the history of topics (not just the one previous topic). The complexity and size of the state machine support may vary in different embodiments.

In the case of a close call that one hypothesis is scoring only slightly better than another, a tie results. There is an uncertainty in the measurement that the recognizers make. One is not justified declaring one hypothesis the winner over the other when the phonetic scoring separation is small. Thus, how should the recognition service handle a "tie" of competing hypotheses? When the tieing results go to the same process, there is no problem: let the process deal with tie breaking). However, when the tieing results correspond to different processes (because only one of them will be notified), there is a need for a separate algorithm to decide how to break the tie.

In the case where the close calls relates to competing applications and only one of them will be notified it is important that there is opportunity to use more information to resolve close calls. The simplest most obvious piece of information is that if the user is talking to one particular application, probably he will continue talking to it. Accordingly, if some application currently has the focus and it is a competitor in a close call situation, probably its hypothesis should "win". In one example, there is an idea of the best hypothesis, different from the best scoring hypothesis. Determining the best hypothesis is an algorithm where the recognition score has a big weight but not a determining weight. Ideas of context matter should be a factor in close calls.

Thus, one way to resolve the tie is to prefer the process that is currently (or was most recently) the foreground process. There may be other tie breaking algorithms. There might be an embodiment where each application peeks at the results and returns a score about how well it "liked" it, or an application may have first refusal—if the application doesn't "like the result", it can be passed on to a competitor. Another option would be to allow a user definable callback function where the user can set the tie-breaking strategy (so that an external service can be called to break the tie). When no callback strategy is set, you fall back to simpler defaults. Tie breaking is a new separate step in the recognition service necessary for multi-process recognition and there are many possible embodiments to it.

Another embodiment of a Multi-Voice recognition manager might run in open dictation contexts—when multiple processes have overlapping word sets and loosely constrained word orders. The different tasks might have different keywords and/or different language models, causing the competition of scoring to pick the preferred recognition engine and do the proper task switching. There could be a topical bias in the different language models so topic spotting would be inherent in the recognition. It might be more reliable to have an explicit topic spotting post processing stage for recognition results to explicitly decide this question. Then included with each set of dictation word production rules, there would be a topic database and a phrase scoring mechanism to measure if a phrase is "on topic". Dealing with recognition results of identical word sequences would be another instance of a "tie". Having a topic database of word profiles and doing explicit post recognition topic spotting is a sophisticated variation of a tie-breaking algorithm and would fit within the scheme of a settable tie-breaking callback function.

At its core the Multi-Voice recognition manager is an AI solution. One of the key functions of intelligence is identification. HMM based recognizers are one of the most accurate identification machines. The multi-voice recognition service uses the recognition results to identify the recipient to receive those results and efficiently glues together disparate tasks. A "good" application only has to be good in its narrow specialty. A swarm of "good" applications is launched and the Multi-Voice recognizer presents all of them as a flat meta-application. The problem of intelligent software is solved piecemeal.

The Multi-Voice recognition system may provide the simultaneous competitive recognition of the word sets from multiple independent processes, then following the recognition, the notification of recognition results being sent to the process that registered the winning word set. This implicitly captures the effect that the recognition service is a task switcher, that there is flat access to processes via speech, and that the application programmer has a simple local programming viewpoint.

The invention claimed is:

1. A method for speaker independent and/or language independent speech recognition comprising the steps:
    operating a plurality of speech recognition engines in parallel, wherein:
        each speech recognition engine is configured with different acoustic models; and
        only one acoustic model for silence or noise is used in all speech recognition engines;
    for a speech input block comprising at least one speech input frame, determining the best scoring speech recognition hypothesis for each speech recognition engine and the best overall score; and
    pruning of speech recognition hypotheses of the plurality of speech recognition engines based on the best overall score.

2. Speech recognition method of claim 1, wherein the speech recognition engines are configured with language models and executed on a computer.

3. Speech recognition method of claim 1, comprising the step of:
    pruning one of the plurality of speech recognition engines if all speech recognition hypotheses of the speech recognition engines are pruned.

4. Speech recognition method of claim 1, wherein the speech recognition engines operate synchronously by processing speech input frame by frame, the pruning being executed every frame.

5. Speech recognition method of claim 1, wherein the speech recognition engines operate by processing a speech input block comprising a plurality of speech input frames and recording the best scoring speech recognition hypothesis for the block, the pruning being executed block-wise.

6. Speech recognition method of claim 1, comprising the step of
    seeding a new speech recognition hypothesis when a word end is determined after the pruning step.

7. Speech recognition method of claim 1, wherein each speech recognition engine is configured with acoustic models for a different speaker.

8. Speech recognition method of claim 1, wherein each speech recognition engine is configured with acoustic models for different types or levels of background noise.

9. Speech recognition method of claim 1, wherein each speech recognition engine uses a set of acoustic speech models, in particular HMMs, and word production rules for restricting allowed words for recognition of the input speech.

10. Speech recognition method of claim 9, wherein simple acoustic speech models and/or restricted word production rules are applied for the plurality of speech recognition engines, and once only one speech recognition engine is alive after pruning, more complex acoustic speech models and/or word production rules are applied to the remaining speech recognition engine.

11. Speech recognition method of claim 1, comprising the step of:
    assigning a speech recognition engine to an application program that expects speech input.

12. Speech recognition method of claim 11, wherein the assigned speech recognition engine is configured with a set of expected words defined by the assigned application program.

13. Speech recognition method of claim 11, wherein different speech recognition engines are assigned to different application processes operating on a computer.

14. Speech recognition method of claim 11, wherein a plurality of application programs are each assigned with separate speech recognition engines, the method comprising the step of:
- notifying the application program having the best scoring speech recognition engine associated about the recognition result for the input speech.

15. Speech recognition method of claim 14, wherein the application programs are executed as processes on a computer, the method comprising the step of:
- bringing the process associated with the best scoring speech recognition engine to the foreground.

16. Speech recognition method of claim 1, comprising the steps of:
- assigning separate speech recognition engines to a plurality of application programs, respectively;
- determining the speech recognition engine having the best scoring speech recognition hypothesis for the present speech input;
- selecting the application program assigned to the best scoring speech recognition engine; and
- forwarding input data including the recognition results of the best scoring speech recognition engine to the selected application.

17. Speech recognition method of claim 11, comprising the step of:
- determining a best speech recognition hypothesis based on the scores of speech recognition hypotheses for each speech recognition engine and context information of the associated application processes.

18. Speech recognition method of claim 11, wherein, when a plurality of speech recognition hypotheses generated by different speech recognition engines have similar scores and one of the application programs associated with these speech recognition engines is at present in the foreground, the application program in the foreground receives the recognition result and remains in the foreground.

19. Speech recognition apparatus for speaker independent and/or language independent speech recognition comprising:
- a plurality of speech recognition means operating in parallel, wherein:
  - each speech recognition engine is configured with different acoustic models; and
  - only one acoustic model for silence or noise is used in all speech recognition engines;
- means for determining the best scoring speech recognition hypothesis for each speech recognition means and the best overall score; and
- pruning means for pruning of speech recognition hypotheses of the speech recognition means based on the best overall score.

20. Speech recognition apparatus of claim 19, wherein the speech recognition means are implemented as speech recognition processes executing on a computer.

21. Speech recognition apparatus of claim 19, comprising a speech recognition manager for determining the speech recognition means having generated the best scoring speech recognition hypothesis for a complete speech input.

22. Speech recognition apparatus of claim 19, comprising a task manager for assigning speech recognition means to application programs and determining the application program which corresponds to the speech recognition means with the best scoring speech recognition hypothesis.

23. Speech recognition apparatus of claim 22, wherein the task manager is configured to notify the application program assigned to the best scoring speech recognition means with the recognition results of the best scoring speech recognition means.

24. Speech recognition apparatus of claim 22, wherein the task manager is configured to switch the active task of a computer system to the application program assigned to the best scoring speech recognition means.

* * * * *